Figure 1:
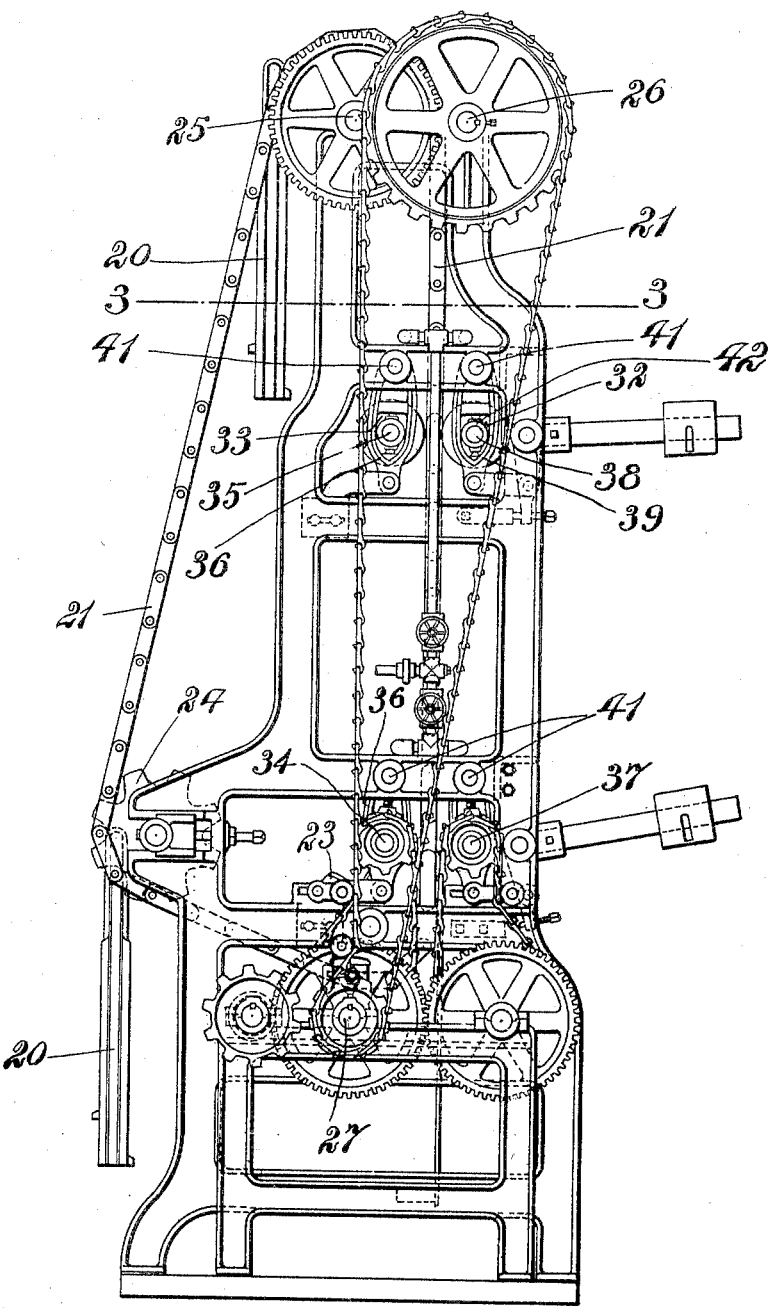

No. 784,017. PATENTED FEB. 28, 1905.
W. B. TURNER.
UNHAIRING MACHINE.
APPLICATION FILED FEB. 1, 1904.

Witnesses:
C. C. Stecher
F. D. Frost

Inventor:
By W. B. Turner
Wright Brown & Quinby
attys.

No. 784,017. PATENTED FEB. 28, 1905.
W. B. TURNER.
UNHAIRING MACHINE.
APPLICATION FILED FEB. 1, 1904.

8 SHEETS—SHEET 2.

Witnesses:
C. C. Steeher
F. D. Forest

Inventor:
W. B. Turner
By Hught & Brown Quimby
attys

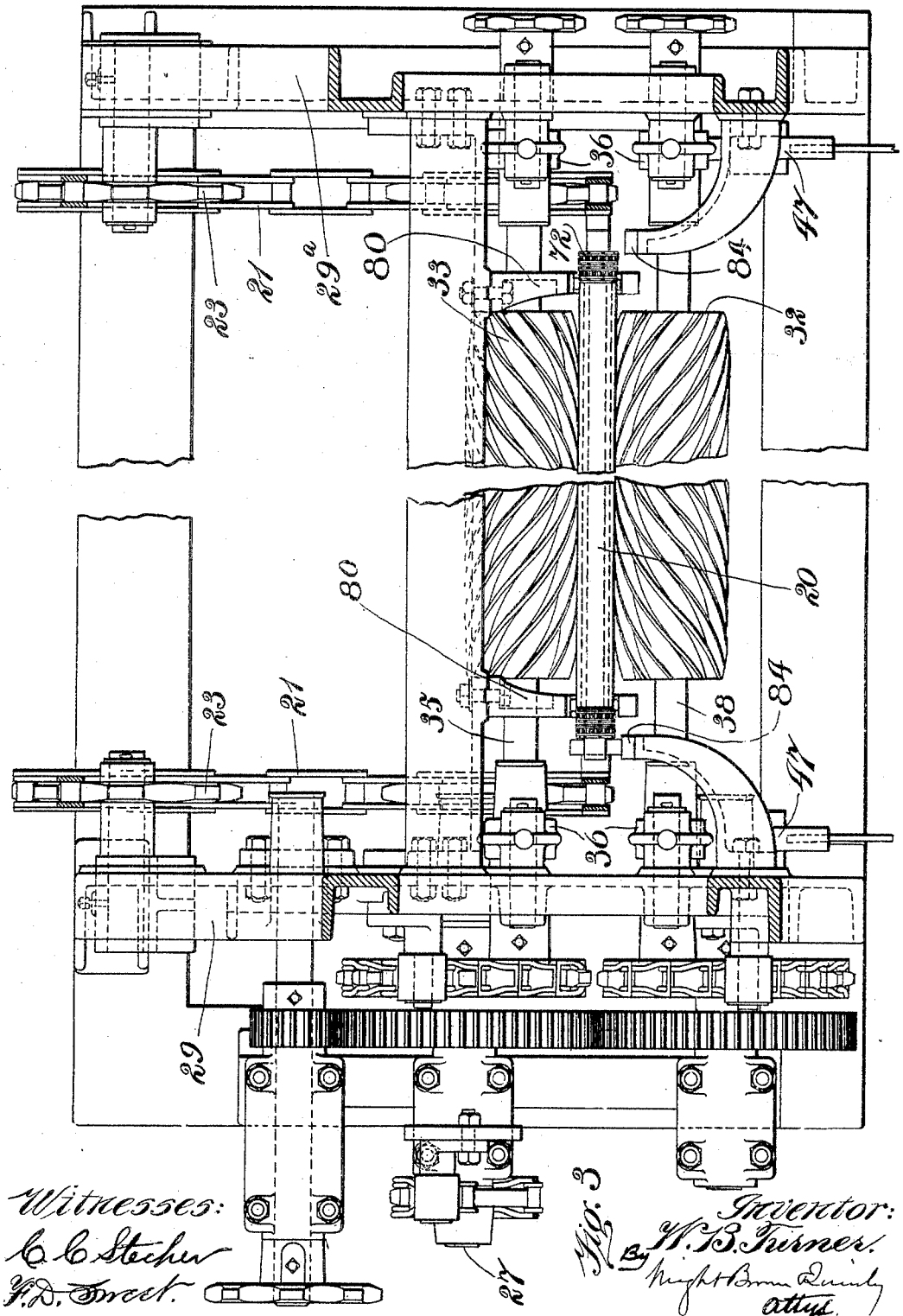

No. 784,017. PATENTED FEB. 28, 1905.
W. B. TURNER.
UNHAIRING MACHINE.
APPLICATION FILED FEB. 1, 1904.
8 SHEETS—SHEET 4.
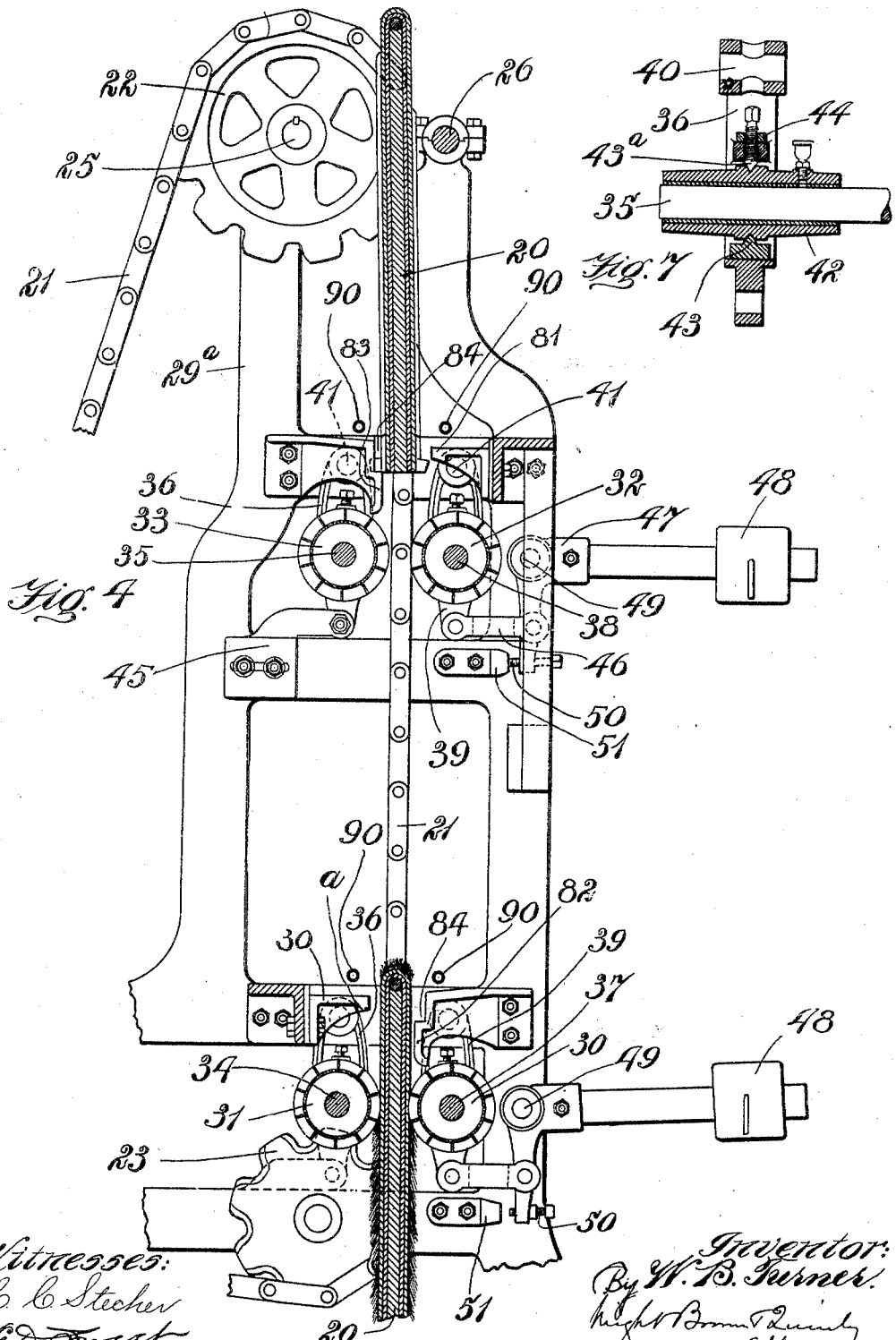

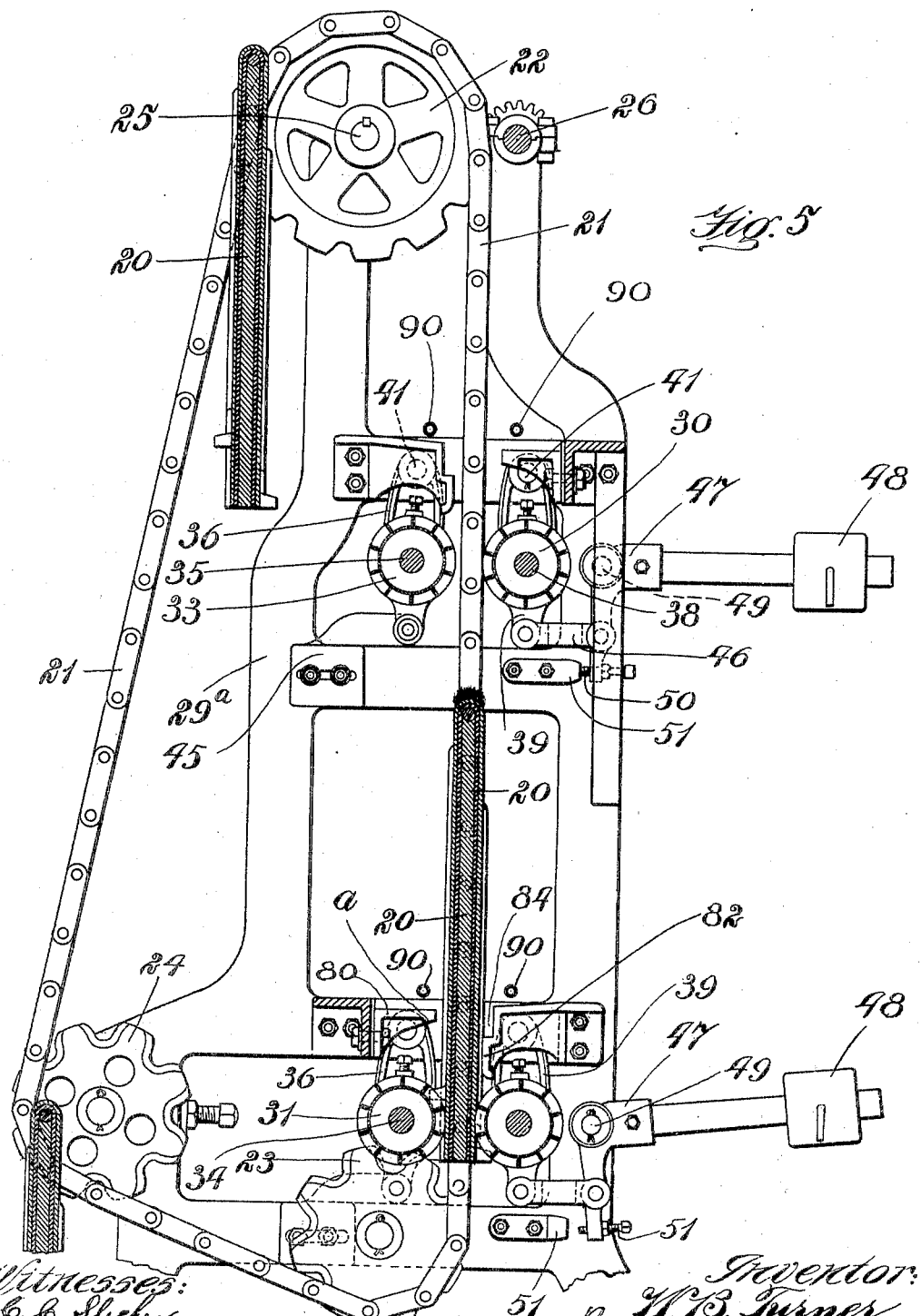

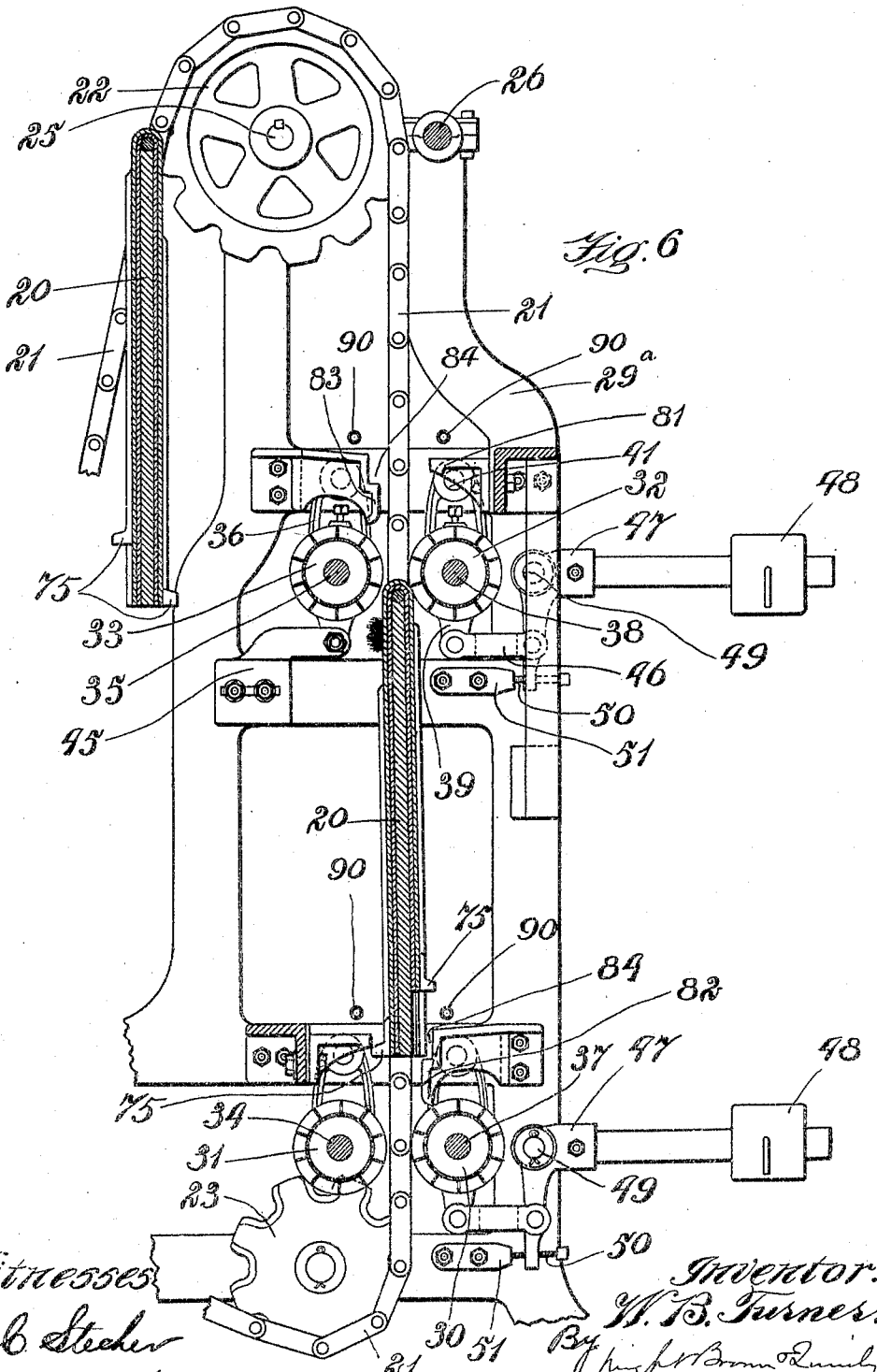

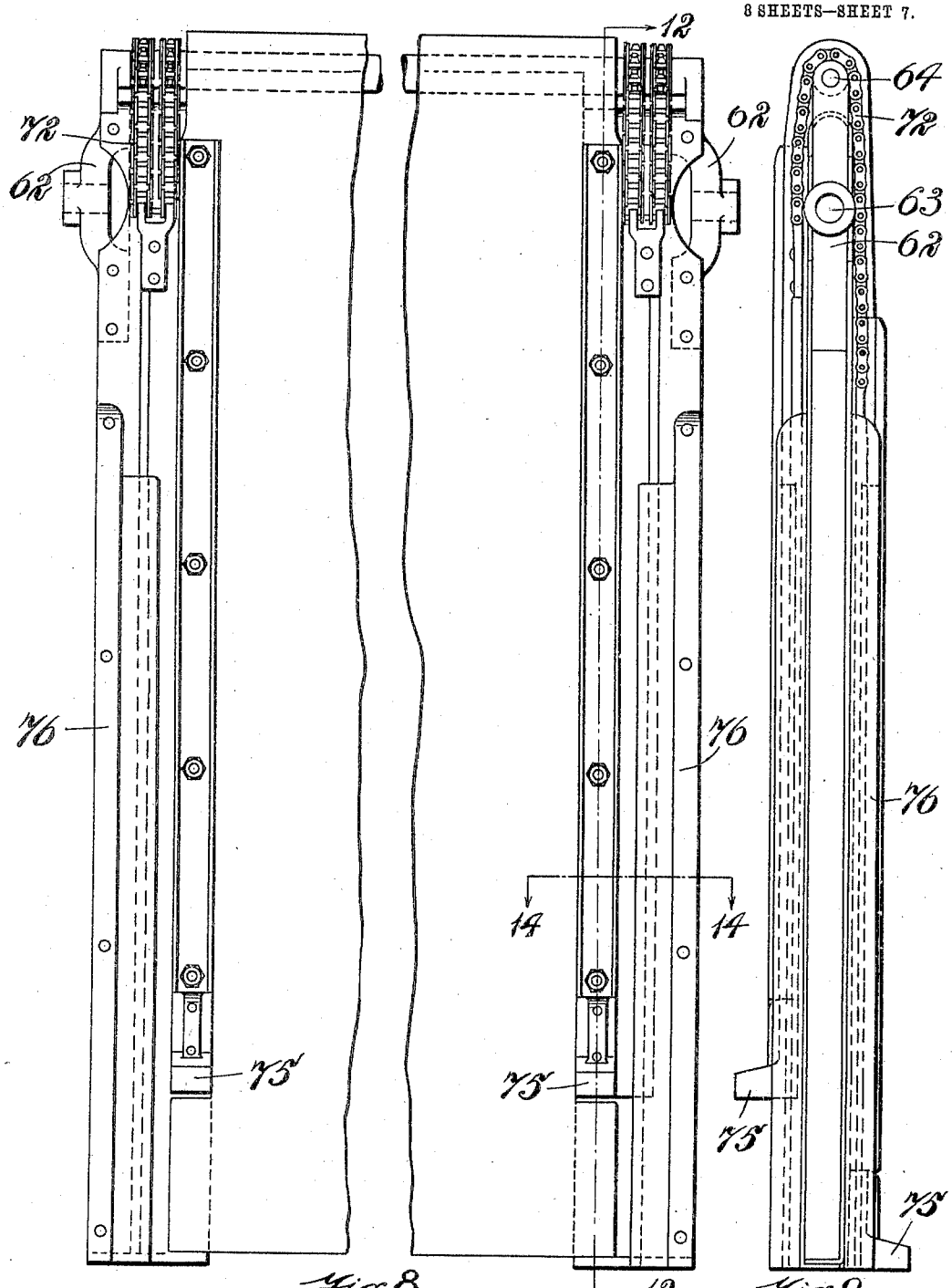

No. 784,017. PATENTED FEB. 28, 1905.
W. B. TURNER.
UNHAIRING MACHINE.
APPLICATION FILED FEB. 1, 1904.
8 SHEETS—SHEET 8.
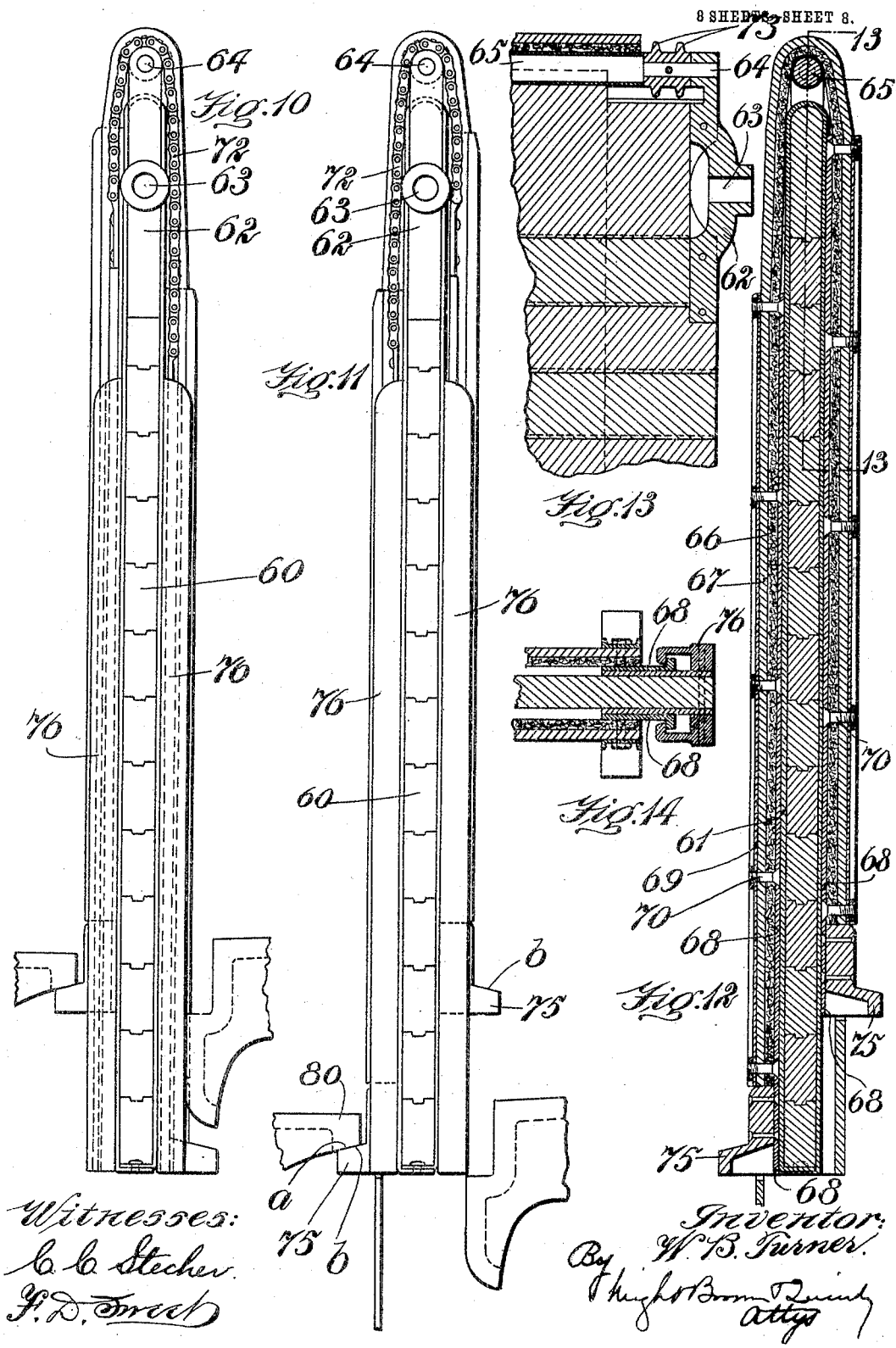

No. 784,017.	Patented February 28, 1905.

UNITED STATES PATENT OFFICE.

WILLIAM B. TURNER, OF MELROSE, MASSACHUSETTS, ASSIGNOR TO THE TURNER TANNING MACHINERY COMPANY, OF BOSTON, MASSACHUSETTS, A CORPORATION OF MAINE.

UNHAIRING-MACHINE.

SPECIFICATION forming part of Letters Patent No. 784,017, dated February 28, 1905.

Application filed February 1, 1904. Serial No. 191,442.

*To all whom it may concern:*

Be it known that I, WILLIAM B. TURNER, of Melrose, in the county of Middlesex and State of Massachusetts, have invented certain new and useful Improvements in Unhairing-Machines, of which the following is a specification.

This invention has relation to machines for working upon skins and hides in the process of converting them into leather, having more particular relation to those machines which are provided with blades for engaging the surface of the hide or skin, such as putting-out, striking-out, and unhairing machines.

The machine illustrated upon the accompanying drawings is represented as an unhairing-machine; but it will be understood that its use is not limited thereto, since it may be also used for putting out or striking out with practically equal facility.

The machine is provided with a plurality of flat tables pivotally attached to and supported by an endless carrier and two sets of working members arranged one above the other in such manner that the tables are successively carried first between the lower members and then between the upper members and mechanism for shifting the skin upon each table while the table is in transit from the lower working members to the upper working members in order that that portion of the skin which lay around the end of the table and was previously untreated by the lower working members may be subsequently acted upon by the upper working members.

Machines have heretofore been constructed with tables having shiftable bolsters thereon and with a carrier for presenting the table to one or more sets of members and means for shifting the bolster; but in such machines mechanism was provided for separating the working members when the table had passed part way between them to permit the shifting of the skin to take place, after which the members were again brought into operative relation to the table to continue their work of treating the remainder of the skin upon the faces of the table. This separation of the members while the table was between them to permit the shifting of the skin proved to be undesirable in the commercial use of the machine, inasmuch as it required considerable mechanism to accomplish it and in many cases proved to have a deleterious effect upon the skin or hide.

In the present invention each table is somewhat shorter than the distance between the two sets of working members, so that after the table leaves the lower set of members and before it is engaged by the upper set of members the bolster is automatically shifted and that portion of the skin which previously lay upon the end of the table is moved into position to be engaged by one of the members of the upper set as the table continues its movement.

Figure 2:
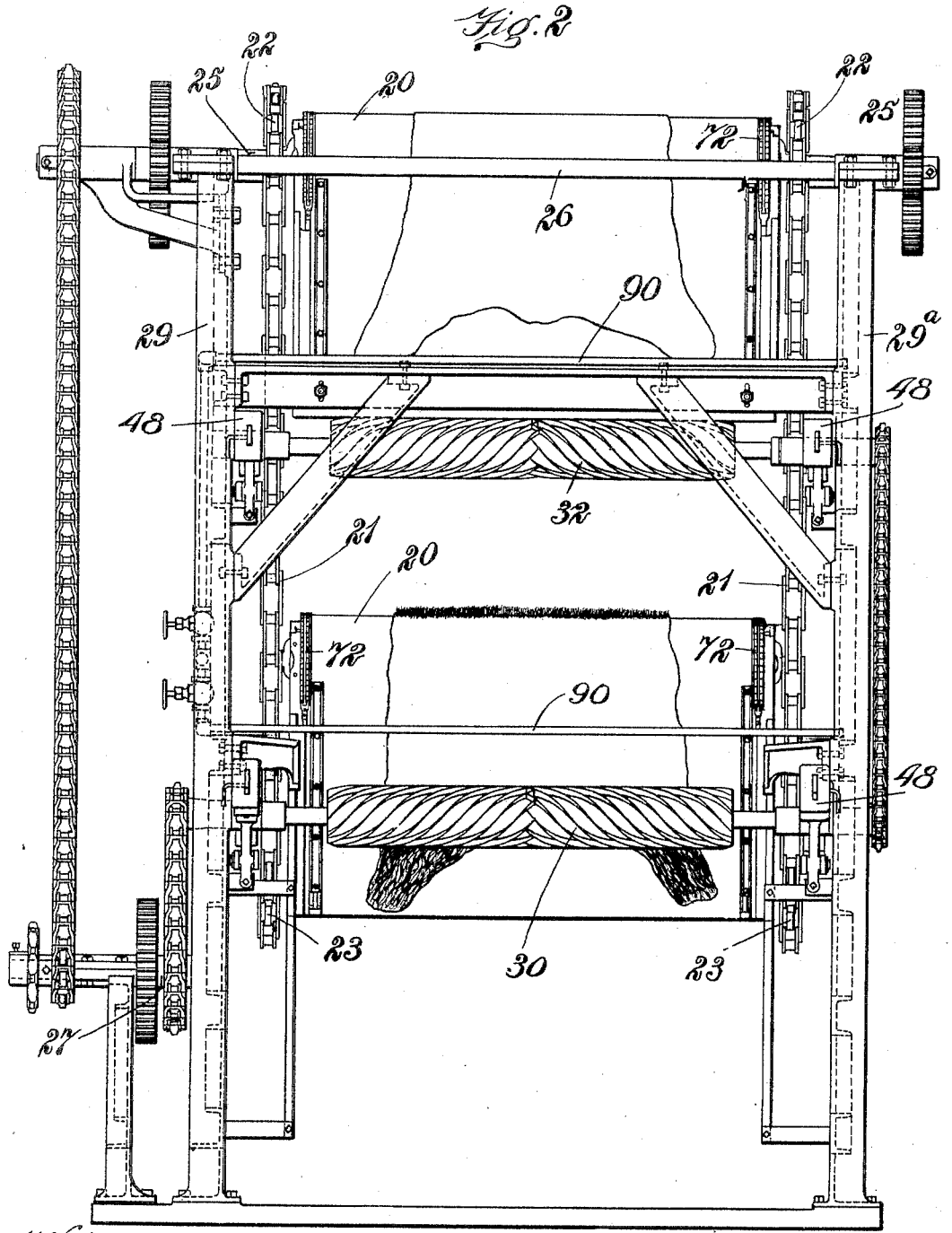

Upon the accompanying drawings, Figure 1 represents in side elevation a machine embodying the invention. Fig. 2 represents a front elevation of the machine. Fig. 3 represents an enlarged section on the line 3 3 of Fig. 1. Fig. 4 represents a vertical section through a portion of the machine and illustrates a table as having passed part way between the members of the lower set. Fig. 5 represents a similar view and illustrates the table as having advanced so that the lower members have nearly completed their work. Fig. 6 represents a similar view and illustrates the table as about to enter between the working members of the upper set. This view illustrates the bolster as having been shifted to bring that portion of the skin which previously lay upon the end of the table upon one of the sides or faces of the table. Fig. 7, Sheet 4, illustrates one of the hangers in which one of the rolls is journaled. Fig. 8 represents a front elevation of one of the tables. Fig. 9 represents an edge view of the same. Fig. 10 represents another edge view and illustrates the position of the bolster and its connected parts immediately prior to the shifting of the bolster on the table. Fig. 11 is a similar view which shows the position of the parts after the shifting has been completed. Fig. 12 represents a section on the line 12 12 of Fig. 8. Fig. 13 represents a partial section on the line 13 13 of Fig. 12. Fig. 14 represents a section on the line 14 14 of Fig. 8.

Referring to the drawings, 20 20 indicate tables the details of construction of which will be subsequently described. These tables are hung upon an endless carrier, consisting of the two chains 21 21, passed around sprocket-wheels 22 22 at the top of the machine, sprocket-wheels 23 near the base of the machine, and idler-sprockets 24 in the rear of the machine. The sprocket-wheels 22 22 are fast upon relatively short shafts 25 25, journaled in standards 29 29ª, said standards constituting the supporting means for the operative portions of the machine. Power is imparted to the said shaft 25 by suitable gearing from a shaft 26, driven by chain-and-sprocket gearing from a shaft 27 near the base of the machine, to which power may be supplied from a motor, a counter-shaft, or other suitable source. The endless carrier travels a triangular path, so that the tables are carried vertically upward along the front of the machine and then travel rearward and downward at an inclination. During their upward travel the tables are caused to pass between two sets of working members arranged one above the other. These working members may be formed in any suitable or desirable way, their precise construction being immaterial to the present invention. They are illustrated, however, as consisting of helically-bladed rolls, the lower pair of rolls being indicated at 30 31, respectively, and the upper pair being indicated at 32 33, respectively. These two pairs of rolls are spaced so far apart, as shown in Fig. 6, that the table may travel an appreciable distance after it leaves the lower set of rolls and before it is engaged by the upper set. The rolls of each pair are rotated in opposite directions to cause their blades to move in a direction opposite to the direction of travel of the tables as said blades engage the skins or hides upon the tables.

The shafts 34 35 of the rolls 31 33 are mounted in hangers 36, and the shafts 37 38 for the rolls 30 32 are mounted in hangers 39. The hangers 36 and 39 are substantially the same as shown in detail in Fig. 7, each hanger being provided with a hub 40, by which it may be pivoted on a stud 41. The roll-shaft in each case is journaled in a bushed box 42, engaged by oppositely-projecting conical points 43 43ª, of which the latter is adjustable and removable. The said points are diametrically opposite, so that the shaft may oscillate to a limited extent about a vertical axis where it is desirable. The lower ends of the hangers 36 are secured to stationary brackets 45, attached to the standards of the machine; but said brackets are adjustable to permit an adjustment of the rolls 31 33 toward and from the lines of travel of the tables. The hangers 39 for the rolls 30 32 are, however, connected by links 46 with bell-crank levers 47, which are weighted by weights illustrated conventionally at 48, said weights being adjustable on said bell-cranks. Said bell-crank levers are fulcrumed at 49, and their play is limited by set-screws 50 and stationary stops or abutments 51. The provision of the weighted bell-cranks connected to the hangers 39 permits of a movement of each of the rolls 30 32 toward and from the lines of travel of the table, and the means of mounting the journal-box 42 in said hangers provides for one end of a roll swinging outward or inward to a greater extent than the other end, and thereby permitting the rolls to accommodate themselves to inequalities in the surfaces of the tables or the skins thereon. The rolls are acutuated by suitable chain-and-sprocket gearing actuated from the shaft 27, illustrated in Figs. 1 and 2, which, however, it will be unnecessary to describe.

As each table passes through a pair of working members the skin on the faces of said table is unhaired, struck out, or put out, as the case may be, by the blades of said members, with the exception of that portion of the skin which lies upon the end or nose of the table. The machine is illustrated on the drawings as being employed in the unhairing of skins, and it will be seen from Fig. 4 that the skin on the lowermost table has upon that portion which lies upon the end or nose of the table the hair which has not been removed.

For the purpose of effecting a shifting of the skin upon the table in order that hair may be removed or that portion of the skin upon the end of the table otherwise treated by the next or upper pair of rolls the following mechanism may be employed, and in explaining said mechanism it will be first necessary to describe the construction of the tables. Referring to Figs. 8 to 14, inclusive, it will be seen that the body of each table may be formed of matched boards with a covering 61, of zinc or any other suitable material. At the outer edge of each table, near its upper end or nose, there is attached a metallic bar 62, which is apertured, as at 63, for the reception of the pivot-pin which connects it to the endless carrier. The end of said bar projects beyond the body of the table to receive the trunnions 64 of a covered roll 65, which forms the end of the table and which is substantially equal in diameter to the thickness of the body of the table. Stretched about the table, so as to cover the nose or end thereof and the two faces of the table, is a bolster consisting of an inner layer 66, of suitable cushioning material, such as felt, and an outer layer 67, of relatively harder material, such as rawhide, vulcanized rubber, rubber-cloth, or the like. Where the machine is employed for unhairing or striking out, it is preferable that this outer covering should be impervious. Between the table and the inner layer of the bolster at the outer edges of the table are straps 68, which are connected to exterior straps 69 by sunken bolts 70 passed through said straps and through the material intervening between them. These bolts serve to connect the two layers of the bolster and the straps firmly together. The two layers of the bolsters are flexible and the straps are relatively short, so that the said bolster may be shifted relatively to the table, the roll 65 serving to reduce the friction which would otherwise occur if a bolster were shifted about a stationary portion at the end of the table. Two straps 68 68, lying on the two faces of the table, at each outer edge thereof, are connected by the chain or cords 72, which pass around sprocket-wheels 73, fast upon the trunnion 64 of the roll 65, for the purpose of effecting the rotation of the roll when the bolster is shifted. To the straps 68 68, at the lower ends thereof, are rigidly secured two metallic stops 75 75, which project from the faces of the table in position to be engaged by stops mounted stationarily upon the frame, as will be explained. In order that the bolster may be maintained in place against the faces of the table, there are secured on each face of the table, at its outer edge, guides 76, which overlap the straps 68, as shown in Figs. 8 and 14. To effect a shifting of the bolster first in one direction to bring the untreated skin on the end of the table in position to be engaged by the upper working member and to again shift the bolster after the table has passed through the said upper working members, the following devices are employed: Attached to the standards are two rigid stops 80 81, respectively. (See Figs. 4 to 6, inclusive.) These stops have inclined faces *a*, adapted to engage the inclined face *b* of the stops 75. Opposite each stop 80 is a thrust rest or abutment 82 or 83, which is cut away, as at 84. The operative face of each thrust rest or abutment is slightly below the face *a* of the stationary stop opposite thereto. With this construction, assuming that the table is traveling upward, as shown in Figs. 4 and 5, the stops 75 on the rear faces of the table finally come into engagement with the stops 80, and as the table continues to move one end of the bolster is arrested, so that as the table continues the bolster is shifted about the table to bring that portion of the skin which previously lay upon the end of the table upon its rear face, as shown in Fig. 6.

The stops 75 are held against the stops 80 by the abutments 82 until the table travels up far enough so that its lower end passes by said abutment, as shown in Fig. 6, whereupon the lower end of the table swings forward, this being assisted by the inclined faces of the stops 75 and 80, and the stop 75 slips out from the said stop 80. This shifting of the bolster occurs during the time that the table is traveling as a whole from the lower working members to the upper working members, so that by the time the upper end or nose of the table enters between the upper working rolls the skin has been shifted, as clearly shown in Figs. 4 to 6, inclusive. The table thus passes between the upper rolls until the skin has been satisfactorily treated by them. Then in order to return the bolster to its initial position the stops 75 on the front faces of the tables are engaged by the stops 81, and the front end of the bolster is temporarily held against movement, while the table continues to travel until the lower end of the table passes by the abutments 83, after which the stops 75 slide under the stops 81.

With a machine built as hereinbefore described it is possible to successively treat the entire exposed face of a skin folded over the end of the table.

Where the machine is employed for unhairing, it is at times desirable to drench the skin and the table or cleanse them with liquid, and to this end there are pipes 90 arranged on the machine in such way as to deliver streams of water at the points desired.

Having thus explained the nature of the invention and described a way of constructing and using all of the forms in which it may be made or all of the modes of its use, I declare that what I claim is—

1. A machine of the character described, comprising a work-support having a shiftable bolster thereon, two separated sets of working members between which said table or work-support is carried in succession, and mechanism for automatically shifting the bolster upon said table after said table has passed one set of working members and before it is engaged by the next succeeding set of working members.

2. A machine of the character described comprising a traveling work-support having a shiftable bolster thereon, two sets of working members separated by a space greater than the length of said work-support, and means for automatically shifting the bolster on said work-support when said work-support is between and disengaged from said sets of working members.

3. A machine of the character described, comprising two separated sets of working members, a work-support adapted to pass between the members of the two sets in succession and having a shiftable bolster thereon, stops on said bolster, and stationary stops rigidly fixed on the machine adapted to be engaged by the stops on the bolster to cause said bolster to be shifted first in one direction and then in the other.

4. A machine of the character described, comprising two separated sets of working members, a work-support, means for causing said work-support to pass between the members of the two sets successively, a shiftable bolster on said work-support, a stop on said bolster, and a relatively stationary stop on the machine adapted to be engaged by the first-mentioned stop and arranged so as to temporarily retard the movement of the said bolster as the work-support passes between said working members to effect the shifting of said bolster upon said work-support without separating said working members.

5. A machine of the character described comprising a movable table or work-support, two sets of working members, means for causing said table to pass between the members of said sets successively, a bolster folded over the end of said table, and having its ends free, stops attached to its ends, and stops rigidly affixed to the machine and adapted to be successively engaged by said stops on said bolster.

6. A machine of the character described comprising a movable table or work-support, two sets of working members, means for causing said table to pass between the members of said sets successively, a bolster folded over the end of said table, a stop and an oppositely-disposed abutment in position to permit the passage of the table therebetween, and a stop attached to the bolster and projecting from the face of the table to engage the first-mentioned stop.

7. A machine of the character described comprising a movable table or work-support, two sets of working members, means for causing said table to pass between the members of said sets successively, a bolster folded over the end of said table, a fixed stop, a stop on the bolster adapted to engage said fixed stop, and means for holding the said stops in engagement during the travel of the table until the bolster has been sufficiently shifted.

8. A machine of the character described, comprising an endless carrier, a two-faced table pivotally hung at its upper end upon said carrier, working members between which the table is carried, a bolster folded over said table and shiftable thereon, said bolster having a stop, a stop stationary in the lines of movement of the table for engagement by the first-mentioned stop to effect the shifting of the bolster, and an abutment for pressing said table toward said stationary stop for the purpose described.

9. A machine of the character described, comprising a movable table, a pair of opposing bladed rolls, hangers pivoted at their upper ends and supporting said rolls, means for adjustably securing the hangers for one roll against movement, and pressure mechanism connected to the hangers for the other rolls.

10. A machine of the character described, comprising a movable table, a pair of opposing bladed rolls, means for mounting one of said rolls comprising hangers pivoted at one end, and means for adjustably securing the other ends of said hangers against movement, and means for mounting the other roll consisting of hangers pivoted upon an axis parallel to the roll-axis, a box in each hanger for the roll, and means for pivotally securing each box in its hanger to oscillate about an axis radial of the center of oscillation of said hanger.

11. In a machine of the character described, a two-faced table or work-support, a bolster folded over the end or nose of the table and lying upon the two faces thereof, straps on the outer sides of said bolster, fastenings passed through said straps and bolster, and flexible connections extending from the straps on one face of the table to straps on the other face of the table and passing around the said end or nose of the table.

In testimony whereof I have affixed my signature in presence of two witnesses.

WILLIAM B. TURNER.

Witnesses:
C. C. STECHER,
L. E. KENNEDY.